Figure 1:
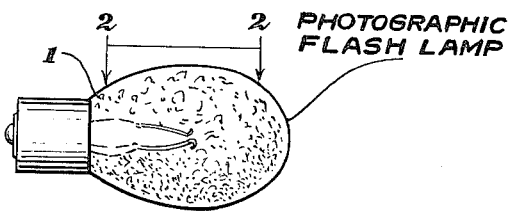

Nov. 30, 1965     J. J. DE PALMA ETAL     3,220,952
SPECTRAL ENERGY CONVERTING BLUE LACQUER FOR PHOTOFLASH LAMPS
Filed June 28, 1962                    3 Sheets-Sheet 1

Charles V. Wilson
James J. De Palma
Mario L. Schiano
INVENTORS

BY R. Frank Smith
Henry E. Byers
ATTORNEYS

Charles V. Wilson
James J. De Palma
Mario L. Schiano
INVENTORS

Charles V. Wilson
James J. De Palma
Mario L. Schiano
INVENTORS

United States Patent Office 3,220,952
Patented Nov. 30, 1965

3,220,952
SPECTRAL ENERGY CONVERTING BLUE
LACQUER FOR PHOTOFLASH LAMPS
James J. De Palma, Mario L. Schiano, and Charles V. Wilson, Rochester, N.Y., assignors to Eastman Kodak Company, Rochester, N.Y., a corporation of New Jersey
Filed June 28, 1962, Ser. No. 205,994
3 Claims. (Cl. 252—300)

This invention concerns flash-bulb coatings for use in producing light having the spectral characteristics of average daylight.

Flash bulbs are used extensively to increase the illumination for taking photographic pictures. With the advent of color photography, it became important to have a light source which was suitable for the particular type of color photographic emulsion. For instance, if an indoor picture were to be taken using daylight color film, it was necessary to provide artificial light having the spectral characteristics of daylight. Accordingly, blue lamps have been provided which produce a match for the color quality of average daylight. These lamps were prepared by incorporating a blue dye in a lacquer coating on the outside of the flash lamp. However, the blue color quality did not provide for spectral energy distribution. Therefore, these blue flash lamps were not suitable for use with more recently marketed reversal color films, and there have been signficant variations in the color rendition obtained with these films when exposed to radiation from clear lamps coated with the known lacquer composition.

The lacquers which have consistently been used for providing blue flash lamps have often contained two dye components, and these two component dye systems have a tendency to be unstable. For example, the violet component in a composition of this type is unstable to light and is also believed to cause significant variability among lamps which have been stored for different lengths of time under varying conditions; also, some of the physical properties of the blue dye component which is the principal component in the known blue lacquers, are not desirable and tend to emphasize the need to improve the lacquer in both spectral transmittance and stability.

It is customary to coat flash lamps with a tough transparent film in order to prevent or reduce the shattering or exploding of the glass envelope due to the extreme heat at the moment of flash. Cellulose acetate coatings which are used for this purpose are disclosed in U.S. Patent 2,787,559, issued April 2, 1957 to Coney and Ball. In order to provide a shatterproof blue lamp, the blue dye is normally incorporated in the transparent coating prior to application to the glass surface. Therefore, a suitable blue lacquer should provide dye stability, spectral energy conversion to daylight quality radiation, compatability with a polymeric transparent film component and sheet protection from glass shattering.

We have discovered a three-component dye system which is preferably incorporated in a cellulose ester lacquer for coating flash lamps to provide good color rendition when used with more recently developed daylight-balanced reversal color photographic emulsions.

One object of this invention is to provide a three-component dye lacquer system which will provide spectral energy conversion to daylight quality radiation. Another object is to provide a blue lacquer suitable for use in preventing shattering, or exploding of glass flash lamps. A further object is to provide a three-component dye system for use in flash-lamp lacquers which is color stable and which will have uniform spectral characteristics after having been stored for varying lengths of time.

The above objects are attained by incorporating in a cellulose ester resin three dye components, preferably 4,8-di(p-triglycolylanilino) anthrarufin, Acid Brilliant Cyanine Blue BLI, and Artisil Direct Red 3BP, dissolved in compatible organic solvents.

The lacquer may be applied to a dry thickness of 3–7 mils.

The cellulose esters which are useful in our invention are those made from the cellulose esters of organic acids such as cellulose acetate, cellulose acetate butyrate, cellulose butyrate, etc., in which the dyes are soluble.

The main dye component in our composition is a blue dye chosen from the general class of tetra-substituted anthraquinones or anthrarufins, or derivatives thereof, of the types disclosed in Allen and Wilson, U.S. Patent 2,611,772, and Hunter, Hoyle, and Nadeau, U.S. Patent 2,622,026. The preferred blue dye has the general formula:

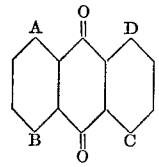

in which A, B, C, and D represent a hydroxyl group, the maximum number of hydroxy groups being two, and —NHR, where R is alkyl, hydroxyalkyl, alkoxyalkyl, N,N-dialkylaminoalkyl, sulfoalkyl, carboxyalkyl, aralkyl, cycloalkyl, and R being aryl, hydroxyalkoxyaryl, carboxy aryl, and sulfo arylamino when there are two hydroxy groups chosen from A, B, C, and D.

Other dyes (red component) which can be used in place of Artisil Direct Red 3BP (Color Index 60710) include Fast Fuchsine 6B (Color Index 16600), and Fuchsine Y (Color Index 42510).

Other dyes (violet component) which can be used in place of Acid Brilliant Cyanine Blue BLI (Color Index 50315) include Celliton Fast Violet 6BA (Color Index 61105), Acid Violet 4BC (Color Index 42580), Pontacyl Violet C4B (Color Index 42576), Acid Pure Blue R Supra (Color Index 42645), D & C Violet No. 1 (Color Index 42640), 1 - (2,3 - dihydroxypropyl) - 2,7-dimethyl-6 - (2,4 - dinitro - 6 - N - ethylsulfamyl)phenylazo-1,2,3,4-tetrahydroquinoline, 1 - (2,3 - dihydroxypropyl) - 6 - (2,4-dinitro - 6 - N - methylsulfamyl)phenylazo - 2 - methyl-1,2,3,4 - tetrahydroquinoline and 1 - (2,3 - dihydroxy-2-methylpropyl) - 6 - (2,4 - dinitro-6-N-methylsulfamyl)-phenylazo-7-methyl-1,2,3,4-tetrahydroquinoline.

The accompanying drawings show by way of example a flash lamp having thereon a blue lacquer and curves illustrating spectral emittance values.

Figure 2:
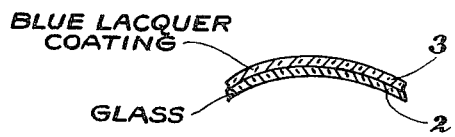

FIGURE 1 shows a photographic flash lamp comprising a customary glass envelope, and a base adapted for electrical discharge of a combustible material contained within the envelope. A blue lacquer 1, comprising a cellulose ester and a three-dye component is carried on the outside of the glass envelope. FIGURE 2 is a fragmentary view taken substantially on line 2—2 of FIGURE 1 looking in the direction of the arrows and shows the glass 2 having a blue lacquer coating 3 thereon.

Figure 3:
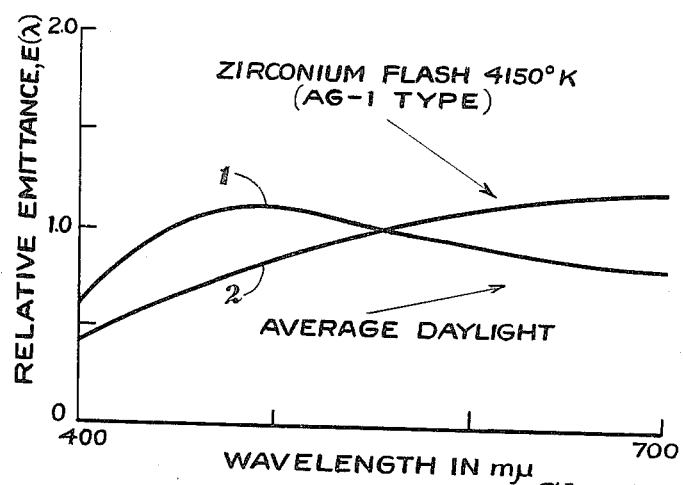
Figure 4:
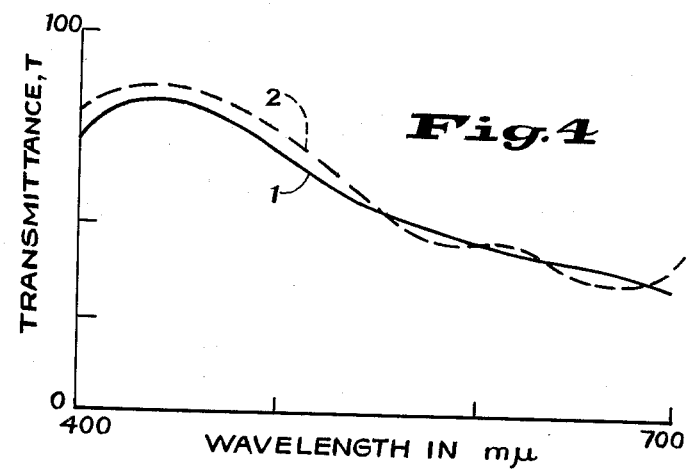
Figure 5:
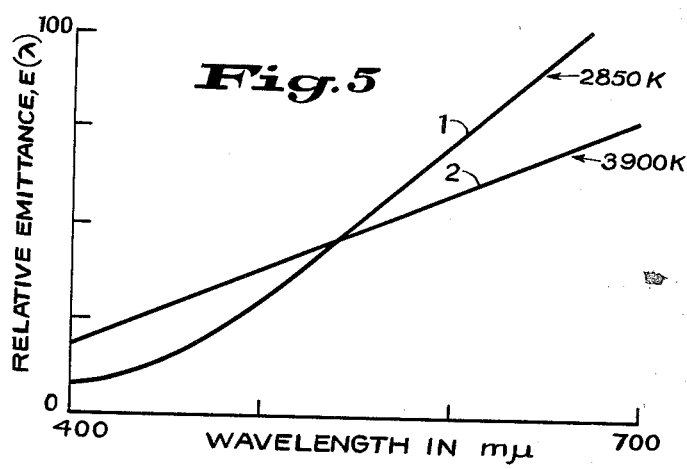
Figure 6:
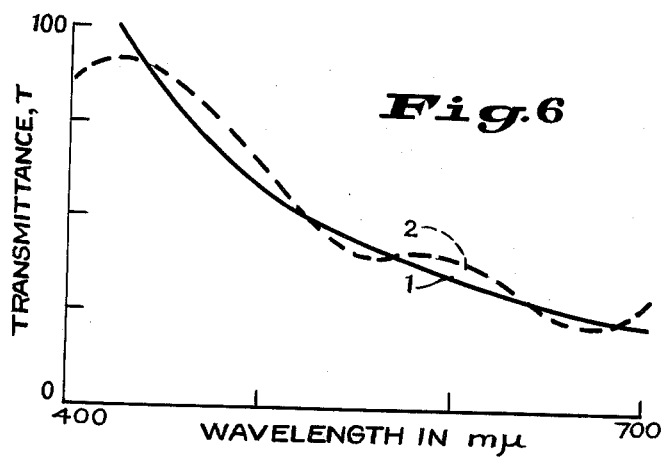
Figure 7:
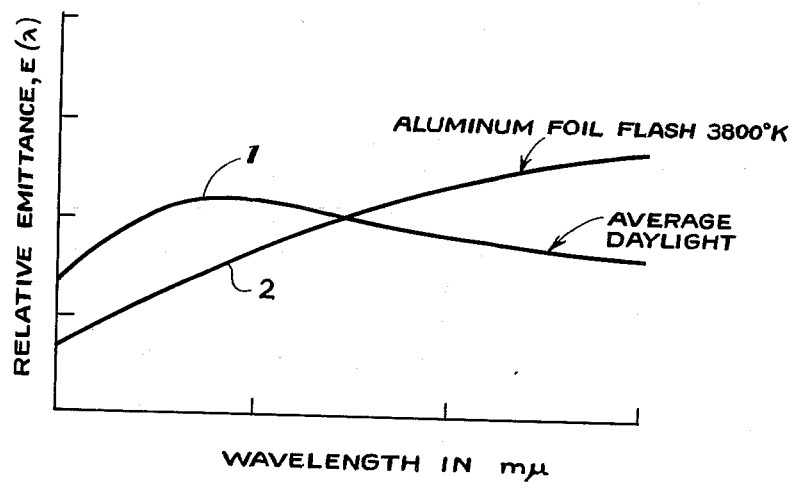
Figure 8:
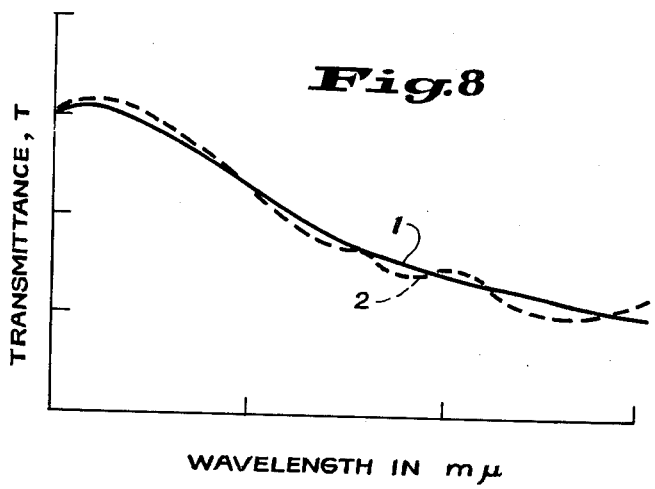

FIGURES 3 and 4 show the relative spectral emittance and spectral transmittance data for the zirconium clear flash conversion lacquer of Example 3 below. FIGURES 5 and 6 illustrate the relative spectral emittance and spectral transmittance data for a tungsten illuminator conversion lacquer of Example 4 below. FIGURES 7 and 8 show the relative spectral emittance and spectral transmittance data for the clear aluminum foil filled flash conversion lacquers of Examples 1 and 2 below.

FIGURE 3, Curve 1, gives the spectral emittance of average daylight.

FIGURE 3, Curve 2, is the spectral emittance of the zirconium clear flashlamp operating at a color temperature of 4150° K.

FIGURE 4, Curve 1, shows the spectral transmittance of the ideal lacquer for converting 4150° K. to average daylight.

FIGURE 4, Curve 2, gives the spectral transmittance of the blue lacquer composition for converting 4150° K. to average daylight.

FIGURE 5, Curve 1, is the spectral emittance of a tungsten lamp operating at a color temperature of 2850° K.

FIGURE 5, Curve 2, gives the spectral emittance of the desired source (3900° K.).

FIGURE 6, Curve 1, shows the spectral transmittance of the ideal lacquer for converting 2850 to 3900° K.

FIGURE 6, Curve 2, illustrates the spectral transmittance of the blue lacquer composition of Example 4.

FIGURE 7, Curve 1, gives the spectral emittance of average daylight.

FIGURE 7, Curve 2, is the spectral emittance of the aluminum foil filled flash lamp operative at a color temperature of 3800° K.

FIGURE 8, Curve 1, shows the spectral transmittance of the ideal lacquer for converting 3800° K. to average daylight.

FIGURE 8, Curve 2, gives the spectral transmittance of the blue lacquer composition for converting 3800° K. to average daylight.

The amount of dye used in the lacquer compositions of our invention must be changed proportionately if the dry thickness of the lacquer coating is increased or decreased. The Artisil Direct Red 3BP dye and the principal dye 4,8-di(p-triglycolylanilino)anthrarufin are useful in the preferred range of 0.5 to 20% by weight of the lacquer composition. The Acid Brilliant Cyanine Blue BLI dye is useful in the preferred range of 0.5–5% by weight.

Other water-insoluble resin vehicles which can be used instead of cellulose acetate include polyamides, polycarbonates, polyalkylenes (e.g., polyethylenes and polypropylenes), polyesters (e.g., polyethylene terephthalates and polyvinyl acetates), acrylics and acrylic esters, polyvinyl chlorides and polystyrenes. The preferred range of resin in the coating composition is 15 to 40% solids by weight.

The following examples are intended to illustrate our invention but not to limit it in any way.

*Example 1*

| | Cc. |
|---|---|
| Cellulose acetate resin acetone dope 29.8% solids | 100 |
| 1% Blue dye [4,8-di(p-tri-glycolylanilino)anthrarufin] in methylene chloride solution disclosed in Formula V, column 3, of U.S. Patent 2,622,026 | 3.30 |
| 0.1% Acid Brilliant Cyanine Blue BLI (Color Index 50315) in methyl Cellosolve solution | 2.00 |
| 1% Artisil Direct Red 3BP (Color Index 60710) in methyl Cellosolve solution | 7.00 |

The lacquer is applied to flashlamps at a dry coating thickness of 3.3 mils.

A satisfactory color rendition was obtained when used with standard daylight color films.

*Example 2.—Conversion of aluminum foil clear flash (3800° K.) to average daylight*

| | Percent by weight |
|---|---|
| Cellulose acetate resin acetone dope (18.9% solids) | 87.24 |
| 1% Blue dye [4,8-di(p-triglycolylanilino)anthrarufin] solution in methylene chloride | 4.29 |
| 0.1% Acid Brilliant Cyanine Blue BLI solution in methyl Cellosolve | 1.87 |
| 1% Artisil Direct Red 3BP solution in methyl Cellosolve | 6.60 |
| | 100.00 |

The dry coating thickness is 3.3 mils.

Clear aluminum filled flashlamps coated with this lacquer and used with daylight Kodachrome II, Ektachrome, and High Speed Ektachrome, as well as Kodachrome I, gave a color rendition very close to the preferred color reproduction.

*Example 3.—Conversion of zirconium clear flash (4150° K.) to average daylight*

| | Percent by weight |
|---|---|
| Cellulose acetate resin acetone dope (18.9% solids) | 90.36 |
| 1% Blue dye [4,8-di(p-triglycolylanilino)anthrarufin] solution in methylene chloride | 3.50 |
| 0.1% Acid Brilliant Cyanine Blue BLI solution in methyl Cellosolve | 1.94 |
| 1% Artisil Direct Red 3BP in methyl Cellosolve solution | 4.20 |
| | 100.00 |

The lacquer was applied to the flashlamps at a dry coating thickness of 3.3 mils. A satisfactory color rendition was obtained when used with standard daylight color films.

*Example 4.—Conversion of tungsten 2850° K. to 3900° K. for use in a transparency illuminator*

| | Percent by weight |
|---|---|
| Cellulose acetate resin acetone dope (18.9% solids) | 88.52 |
| 1% Blue dye [4,8-di(p-triglycolylanilino)anthrarufin] solution in methylene chloride | 4.22 |
| 0.1% Acid Brilliant Cyanine Blue BLI solution in methyl Cellosolve | 1.90 |
| 1% Artisil Direct Red 3BP in methyl Cellosolve solution | 5.36 |
| | 100.00 |

The lacquer was applied to the illuminator diffusing glass or plastic surface at a dry coating thickness of 3.3 mils.

Various volatile organic solvents are known for use in lacquers and the particular volatile solvents are not critical in carrying out our invention. Moreover, the solvents may be varied depending upon compatibility, solubility and the like, which may be desirable for use with the particular film former selected. The proportions of solids to solvent may also be varied depending upon the thickness desired, the method of coating, such as dipping or the like, and the type of substrate. As shown in the examples, other surfaces may be coated with a coating composition containing the dye combination illustrated herein, such as transparency illuminators and the like wherever it is desirable to provide an accurate spectral energy conversion from artificial light to daylight, sunlight, etc. A typical coating composition for flashlamps is disclosed in U.S. Patent 2,787,559, issued April 2, 1957, to Coney and Ball. Our dye composition may be incorporated in the coating composition disclosed therein. In the dried-down condition, our preferred coating contains 0.01 to 1.0% by weight of the Artisil Direct Red 3BP, 0.01 to 1.0% by weight of the 4,8-di(p-triglycolylanilino)anthrarufin, and 0.01 to 0.25% by weight of Acid Brilliant Cyanine Blue BLI.

The invention has been described in detail with particular reference to preferred embodiments thereof, but it will be understood that variations and modifications can be effected within the spirit and scope of the invention as described hereinabove and as defined in the appended claims.

We claim:
1. A flashlamp coating composition comprising
(a) a volatile organic solvent having dissolved therein a substantially water insoluble organic polymeric film former,
(b) a blue dye having the general formula:

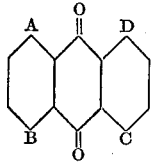

in which A, B, C, and D represent a hydroxyl group, the maximum number of hydroxy groups being two, and —NHR, where R is alkyl, hydroxyalkyl, alkoxyalkyl, N,N-dialkylaminoalkyl, sulfoalkyl, carboxyalkyl, aralkyl, cycloalkyl, and R being aryl, hydroxyalkoxyaryl, carboxy aryl, and sulfo aryl when there are two hydroxy groups chosen from A, B, C, and D,
(c) a red dye selected from the class consisting of Artisil Direct Red 3BP, Fast Fuchsine 6B, and Fuchsine Y, and
(d) a violet dye selected from the class consisting of Acid Brilliant Cyanine Blue BLI, Celliton Fast Violet 6BA, Acid Violet 4BC, Pontacyl Violet C4B, Acid Pure Blue R Supra, D & C Violet No. 1, 1-(2,3-dihydroxypropyl)-2,7-dimethyl - 6 - (2,4-dinitro-6-N-ethylsulfamyl)phenylazo - 1,2,3,4 - tetrahydroquinoline, 1-(2,3-dihydroxypropyl) - 6 - (2,4-dinitro-6-N-methylsulfamyl)phenylazo - 2 - methyl-1,2,3,4-tetrahydroquinoline and 1-(2,3-dihydroxy - 2 - methylpropyl) - 6 - (2,4-dinitro-6-N-methylsulfamyl)phenylazo-7-methyl-1,2,3,4-tetrahydroquinoline,
said dyes being present in the coating composition in concentrations to effectively convert radiation from a flash lamp to closely approximate average daylight.
2. A flashlamp coating composition comprising
(a) a volatile organic solvent having dissolved therein a cellulose ester film former,
(b) a blue dye having the general formula:

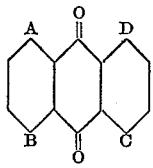

in which A, B, C, and D represent a hydroxyl group, the maximum number of hydroxy groups being two, and —NHR, where R is alkyl, hydroxyalkyl, alkoxyalkyl, N,N-dialkylaminoalkyl, sulfoalkyl, carboxyalkyl, aralkyl, cycloalkyl, and R being aryl, hydroxyalkoxyaryl, carboxy, and sulfo aryl when there are two hydroxy groups chosen from A, B, C, and D,
(c) a red dye selected from the class consisting of Artisil Direct Red 3BP, Fast Fuchsine 6B, and Fuchsine Y, and
(d) a violet dye selected from the class consisting of Acid Brilliant Cyanine Blue BLI, Cellition Fast Violet 6BA, Acid Violet 4BC, Pontacyl Violet C4B, Acid Pure Blue R Supra, D & C Violet No. 1, 1-(2,3-dihydroxypropyl)-2,7-dimethyl - 6 - (2,4-dinitro-6-N-ethylsulfamyl)phenylazo - 1,2,3,4 - tetrahydroquinoline, 1-(2,3-dihydroxypropyl) - 6 - (2,4-dinitro-6-N-methylsulfamyl)phenylazo - 2 - methyl-1,2,3,4-tetrahydroquinoline and 1-(2,3-dihydroxy - 2 - methylpropyl) - 6 - (2,4 - dinitro-6-N-methylsulfamyl)phenylazo-7-methyl-1,2,3,4-tetrahydroquinoline,
said dyes being present in the coating composition in concentrations to effectively convert radiation from a flash lamp to closely approximate average daylight.
3. A coating composition consisting essentially of about 87% cellulose acetate resin acetone dope containing 18.9% solids, about 4% by weight 4,8-di(p-triglycolylanilino)anthrarufin, in a 1% methylene chloride solution, about 2% of a 1/10 solution in ethylene glycol monomethyl ether of Acid Brilliant Cyanine Blue BLI and about 7% of a 1% solution in ethylene glycol monomethyl ether of Artisil Direct Red 3BP.

References Cited by the Examiner
UNITED STATES PATENTS

| | | | |
|---|---|---|---|
| 2,465,068 | 3/1949 | Dana | 252—300 XR |
| 2,527,010 | 10/1950 | Jenner | 252—300 XR |
| 2,868,670 | 1/1959 | Van Laar et al. | 117—113 XR |

JULIUS GREENWALD, *Primary Examiner.*
ALBERT T. MEYERS, *Examiner.*